INVENTOR
FRITZ NAUMANN

BY Craig & Antonelli

ATTORNEYS 3,509,914
CONTROL DEVICE, ESPECIALLY HEIGHT-CONTROL DEVICE FOR HYDROPNEUMATIC SPRING INSTALLATIONS WITH FLOW CONTROL
Fritz Naumann, Unterensingen, Kreis Nurtingen, Germany, assignor to Daimler-Benz Aktiengesellschaft, Stuttgart-Unterturkheim, Germany
Filed Apr. 12, 1968, Ser. No. 720,973
Claims priority, application Germany, Apr. 14, 1967, D 52,802
Int. Cl. F16k 11/10
U.S. Cl. 137—628
21 Claims

ABSTRACT OF THE DISCLOSURE

A control device, especially a height-control device for hydropneumatic spring systems in motor vehicles, which is equipped with connections to a pump, to a tank and to an oil space of the spring cylinder or the like, to be selectively connected with each other by the control device; more particularly, an excess pressure valve is provided between the connection of the pump and the connection of the oil space while a rotary valve is arranged between the connection of the pump and the connection of the tank; the rotary valve in its turn is provided with a control edge for controlling a further valve disposed between the connection of the tank and the connection of the oil space.

BACKGROUND OF THE INVENTION

The present invention relates to a control device, especially a height-regulator for hydropneumatic spring installations in motor vehicles provided with a flow control, which is equipped with connections for a pump, a tank and an oil space of a spring cylinder or the like which it connects alternately with each other.

Known control devices of this type have an extremely complicated construction in order to enable the individual control operations.

SUMMARY OF THE INVENTION

The present invention aims at simplifying such types of control devices and at improving their effectiveness. The present invention essentially consists in that between the connection of the pump and the connection of the oil space of the spring cylinder or the like an excess pressure valve is provided, and in that between the connection of the pump and the connection of the tank a rotary valve is arranged which includes a control edge for the actuation of a valve disposed between the connection of the tank and the connection of the oil space of the spring cylinder or the like. If the rotary slide valve closes the connection between the pump and the tank, then a pressure builds up downstream of the pump. As soon as the pressure is greater than the pressure in the oil space of the spring cylinder, the excess pressure valve opens and the oil flows into the oil space of the spring cylinder. A lifting then takes place for the purpose of level control. For the purpose of discharge, the rotary valve is rotated into the position in which the communication between the connection of the pump and the connection of the tank is open and the control edge opens the valve between the connection of the tank and the connection of the oil space of the spring cylinder. The oil now flows out of the oil space of the spring cylinder into the tank.

It is essential for the usefulness of such types of control devices that after termination of the control operation, the connection between pump and tank is completely opened so that the pump no longer has to operate against pressure. This is achieved according to a further feature and construction of the present invention in that the rotary slide valve is arranged movable in the axial direction between a wall, in which terminates a channel of the connection of the pump, and a wall from which starts a channel to the connection of the tank. With closed rotary valve, the pump builds up a considerable pressure and presses the rotary valve against the wall from which starts the channel to the connection of the tank. The adjusting mechanism which actuates the rotary valve now has to overcome a considerable friction force. By reason of its elasticity, the rotary valve lags or trails behind the movement of the adjusting mechanism. The abutment force continues to remain in existence for such length of time until the rotary valve opens the connection between pump and tank. A rapid pressure decrease now takes place and by reason of the elastic deformation, the rotary valve snaps back essentially instantaneously in a jump-like maner into its fully opened position because the frictional force to be overcome disappears with the pressure decrease. In order not to permit the frictional force to be overcome to become excessively large, provision may also be made that the abutment surface for the rotary valve is kept small by the accommodation of recesses or depressions in communication with the pressure oil.

If the adjusting mechanism is rigidly connected with the regulator or control device then, in order to achieve the same snap-effect, provision may be made that an elastic entrainment mechanism is provided between an actuating shaft and the rotary valve.

In order to seal the control device toward the outside against the considerable pressures, the actuating shaft may be sealed with respect to the outside by means of an O-ring and may be provided in front of this O-ring with an annular groove that is in communication by way of a channel with the connection of the tank. It is achieved thereby that the O-ring is not loaded with the high pressure.

An extraordinarily advantageous construction of the present invention is finally obtained if the valve between the connection of the tank and the connection of the oil space of the spring cylinder or the like is constructed as ball check valve whereby the seat and the radius of the ball are matched to each other in such a manner that the ball protrudes in part beyond the seat into the area of the rotary valve. The rotary valve then directly actuates with its control edge the ball of the ball check valve.

Accordingly, it is an object of the present invention to provide a control device, especially a height-regulator for hydropneumatic spring installations with flow control which avoids, by extremely simple and operationally reliable means, the aforementioned shortcomings and drawbacks encountered in the prior art.

Another object of the present invention resides in a control device for controlling the height of a motor vehicle equipped with hydropneumatic springs which enables the individual control operations without a complicated construction and without costly parts.

Still another object of the present invention resides in a control device for controlling the height in connection with hydropneumatic spring systems which is not only simple in construction and reliable in operation but which offers great versatility in the various control functions.

A further object of the present invention resides in a control device of the type described above which is so constructed and arranged that the pump need not work against pressure after the termination of the control operation.

A still further object of the present invention resides in a control device for motor vehicles of the type described above which permits ready sealing of the various parts without subjecting the sealing rings to high pressures.

Still another object of the present invention resides in a height-control device for hydropneumatic spring systems in which simple structural parts are used providing unequivocal control functions as determined by the existing needs.

These and further objects, features, and advantages of the present invention will become more obvious from the following description when taken in connection with the accompanying drawing which shows, for purposes of illustration only, one embodiment in accordance with the present invention, and wherein.

Figure 1:
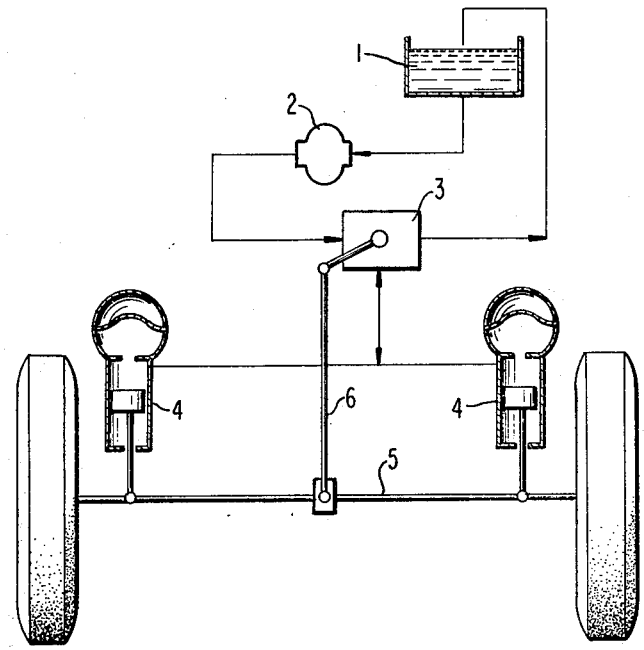
FIG. 1 is a schematic view of a hydropneumatic spring installation for a motor vehicle axle equipped with a control device of the present invention.

Referring now to the drawing wherein like reference numerals are used throughout the various views to designate like parts, and more particularly to FIG. 1, with a flow control for the height of the vehicle, the oil is conventionally supplied in the illustrated height-control device from the tank 1 by means of a pump 2 through the control device 3 back into the tank 1 in a conventional manner. The pump 2 is connected with the vehicle engine and runs as soon as the engine is turned on; the pump 2 is turned off again only when the engine is again turned off.

The control device 3 has the purpose, depending on the load changes of the vehicle, either to supply oil to the spring cylinder 4 or to cause oil to flow off out of the spring cylinder 4 in order that the predetermined height position of the motor vehicle is maintained. The regulator or control device 3 is rigidly mounted at the vehicle superstructure and is actuated by means of an adjusting mechanism 6 rigidly connected with the vehicle axle 5 corresponding to the height difference between vehicle superstructure and vehicle axle 5.

Figure 2:
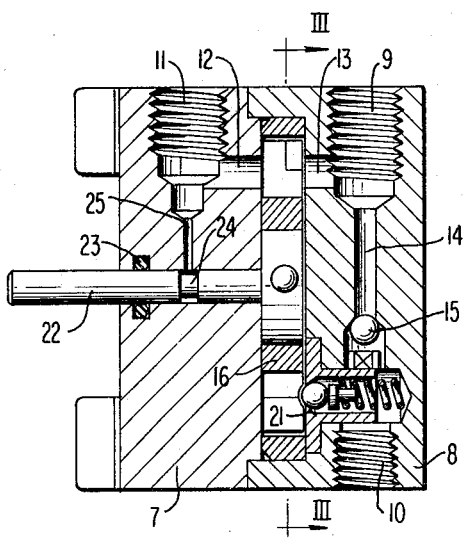
FIG. 2 is a cross-sectional view through a control device according to the present invention, taken along line II—II of FIG. 3.
Figure 3:
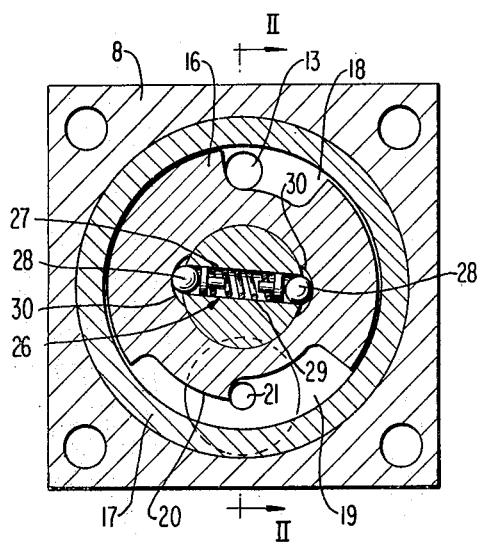
FIG. 3 is a cross-sectional view through the control device taken along line III—III of FIG. 2.

The height-control device itself (FIGS. 2 and 3) consists of a two-partite housing, whose one part 8 is provided with threaded bores as connections 9 and 10 of the lines leading to the pump 2 and to the oil spaces of the spring cylinders 4, respectively, and whose other part 7 is provided with a threaded bore as connection 11 of the line to the tank 1. The connection 11 of the tank 1 and the connection 9 of the pump 2 are in communication with each other by way of channels 12 and 13. The connection 9 of the pump 2 and the connection 10 of the oil spaces of the spring cylinders 4 are also connected by means of a channel 14 in which is arranged an excess pressure valve constructed as ball check valve 15.

The rotary slide valve 16 is arranged between the two housing parts 7 and 8 and is guided within a spacer ring 17. The rotary valve 16 is provided with an aperture 18 by means of which it is able to open up the connection between the channels 12 and 13 to the connection 11 of the tank 1 and to the connection 9 of the pump 2. Simultaneously, the rotary valve 16 includes an aperture 19 and a control edge 20 by means of which it actuates a ball check valve 21 that is arranged in the connection 10 to the oil space of the spring cylinders 4 downstream of the excess pressure valve 15.

The actuating shaft 22 of the rotary valve 16 is sealed against the outside by means of an O-ring 23 and comprises additionally an annular groove 24 which is connected by way of a channel 25 with the connection 11 of the tank 1.

If, for example, the vehicle is now loaded more heavily, then the adjusting mechanism 6 rotates by way of the adjusting shaft 22 the rotary valve 16 which closes the connection between the pump 2 and tank 1. The pump 2 now builds up a pressure and as soon as this pressure is greater than the pressure in the oil space of the spring cylinder 4, the oil is supplied into this oil space. As a result thereof, the vehicle superstructure is raised with respect to the axle 5.

The rotary valve 16 is pressed against the housing part 7 by means of the high pressure produced by the pump 2. A considerable frictional force results therefrom which has to be overcome by the adjusting mechanism 6. In general, the adjusting mechanism 6 is elastic by reason of its dimensions so that elastic deformations occur in the adjusting mechanism by reason of these frictional forces. The movement of the rotary valve 16 thus lags behind the movement of the adjusting mechanism 6 corresponding to this elastic deformation. If near the end of the control operation the rotary valve 16 has now partly opened the communication between the connection 9 of the pump 2 and the connection 11 of the tank 1, then a rapid pressure decrease ensues. The frictional force disappears, and the elastic deformation in the adjusting mechanism 6 is now cancelled or eliminated. A jump-like, complete opening of the communication between the connection 9 of the pump 2 and the connection 11 of the tank 1 takes place now as a result thereof. The excess pressure valve 15 closes simultaneously with the pressure decrease.

In order to achieve the same jump-like snap-effect with an adjusting mechanism, which does not permit of any elastic deformation, an elastic entrainment mechanism 26 is provided between the actuating shaft 22 and the rotary valve 16. The elastic entrainment mechanism 26 consists in the illustrated embodiment of two balls 28 arranged within a bore 27 of the actuating shaft 22 which are forced outwardly by a coil spring 29. The balls 28 engage in semi-circularly shaped larger apertures 30 in the rotary valve 16. A differing entrainment force can be realized thereby which causes a trailing or lagging of the rotary valve 16 with respect to the actuating shaft 22 and therewith effects the desired snap effect.

If the vehicle is now again unloaded, then in order to re-adjust the correct height, oil has to be drained out of the oil spaces of the spring cylinders 4. This takes place in the illustrated embodiment by rotation of the rotary valve 16 in the counter-clockwise direction as viewed in FIG. 3. The rotary valve 16 now opens by means of the control edge 20 the ball check valve 21 whereas the communication between the connection 9 of the pump 2 and the connection 11 of the tank 1 remains fully opened. The oil now flows off out of the oil spaces of the spring cylinders 4 along the rotary valve 16 to the connection 11 of the tank 1.

I claim:

1. A control device, which is equipped with connections for a pump, for a tank and for an oil space of a spring cylinder or the like and which selectively connects with each other these connections, wherein the improvement comprises excess pressure responsive valve means provided between the connection for the pump and the connection for the oil space of the spring cylinder, a further valve means disposed between the connection for the tank and the connection for the oil space of the spring cylinder, rotary valve means arranged between the connection for the pump and the connection for the tank including control surface means for the actuating of said further valve means.

2. A control device according to claim 1, wherein said excess pressure valve means is constructed as a ball check valve.

3. The control device according to claim 1, including a housing having two spaced walls mounting therebetween said rotary valve means for rotation about an axis and for movement along the axis between said two walls to provide an axial clearance, one of said walls having a fluid channel in communication with the connection for a pump, the other of said walls having a fluid channel in communication with the connection for a tank, said axial clearance at least partially constituting means fluid interconnecting said fluid channels.

4. The control device according to claim 3, wherein said rotary valve has a side for engaging said other wall, which is provided with surface portions for engagement with said other wall and depressions between said surface portions fluid connected with said connection for a pump to reduce frictional force between said rotary valve and said other wall when said rotary valve is pressed against said other wall by pressure from the connection for a pump.

5. The control device according to claim 4, including an actuating shaft, and elastic entrainment means drivingly connecting said actuating shaft with said rotary valve means enabling said rotary valve means to trail behind said actuating shaft with lost motion in response to friction between said rotary valve means and said other wall.

6. The control device according to claim 5, further including means for sealing said actuating shaft, said sealing means including an O-ring surrounding said shaft and an annular groove in said shaft axially between said rotary valve means and said O-ring in communication with said connection for a tank.

7. A control device according to claim 6, wherein said excess pressure valve means is constructed as a ball check valve.

8. The control device according to claim 6, wherein said further valve means is a ball-type check valve having a valve seat and ball radius so related to each other that the ball protrudes beyond the seat in the rotary path of said rotary valve means, so that rotary movement of said rotary valve means may dislodge said ball from its seat and open the ball-type check valve.

9. The control device according to claim 1, including a housing rotatably mounting therein said rotary valve means and provided with a wall for abutting axial engagement with said rotary valve means, said rotary valve means having a side for engagement with said wall that is provided with depression means in communication with said connection for a pump to provide oil between said rotary valve means and said housing wall to reduce friction therebetween.

10. The control device according to claim 1, including an actuating shaft, and elastic entrainment means drivingly connecting said actuating shaft with said rotary valve means to provide lost motion therebetween to enable said rotary valve means to trail behind said actuating shaft.

11. The control device according to claim 10, further including a housing containing therein said rotary valve means and means for sealing said actuating shaft with respect to said housing, said sealing means including an O-ring surrounding said shaft, an annular groove in said shaft between said O-ring and said rotary valve means, and means providing fluid communication between said annular groove and said connection for a tank.

12. The control device according to claim 1, wherein said further valve means is a ball-type check valve having a seat and a ball interrelated so that said ball protrudes beyond said seat into the rotary path of said rotary valve means, so that said rotary valve means engage said ball and cam it away from its seat for opening the ball-type check valve.

13. A control device according to claim 12, wherein said excess pressure valve means is constructed as a ball check valve.

14. The control device according to claim 13, including a housing rotatably mounting therein said rotary valve means and provided with a wall for abutting axial engagement with said rotary valve means, said rotary valve means having a slide for engagement with said wall that is provided with depression means in communication with said connection for a pump to provide oil between said rotary valve means and said housing wall to reduce friction therebetween.

15. The control device according to claim 1, further including a housing containing therein said rotary valve means and means for sealing said actuating shaft with respect to said housing, said sealing means including an O-ring surrounding said shaft, an annular groove in said shaft between said O-ring and said rotary valve means, and means providing fluid communication between said annular groove and said connection for a tank.

16. The control device according to claim 1, in combinatio with a motor vehicle having spring suspension means for controlling the height of the motor vehicle in response to the load carried thereby, said spring suspension means including two wheels having a common axis of rotation, a separate fluid operated spring associated with each of said wheels, each of said spring having a spring cylinder provided with an oil space in communication with said connection for an oil space, a vehicle frame mounting thereon said control device, a mechanical linkage drivingly interconnecting said wheels and said rotary valve means for rotating said valve in response to bodily movement of said wheels toward and away from said frame, and oil storage tank in fluid communication with said connection for a tank, and an oil pump for receiving fluid from said tank and providing pressurized fluid to said connection for a pump.

17. A control device, which is equipped with three connecting means to be selectively connected with each other, wherein the improvement comprises excess pressure valve means provided between a first connection and a second connection, rotary valve means arranged between the first connection and the third connection including control means for the actuation of a further valve means disposed between the third connection and the second connection.

18. A control device according to claim 17, further comprising an actuating shaft for the rotary valve means and entrainment means between said actuating shaft and the rotary valve means enabling said rotary valve means to trail behind said actuating shaft.

19. A control device according to claim 18, further comprising seal means for sealing the actuating shaft including an O-ring for sealing said shaft against the outside and an annular groove in said shaft in front of said O-ring which is in communication with the discharge.

20. A control device according to claim 19, wherein the further valve means is constructed as ball-type check valve, the seat and the radius of the ball being so matched to each other that the ball protrudes in part beyond the seat into the area of the rotary valve means.

21. A control device according to claim 17, wherein the further valve means is constructed as ball-type check valve, the seat and the radius of the ball being so matched to each other that the ball protrudes in part beyond the seat into the area of the rotary valve means.

References Cited

UNITED STATES PATENTS

| 2,360,980 | 10/1944 | Temple | 137—625.23 |
| 2,881,602 | 4/1959 | Baker et al. | 251—81 XR |
| 3,000,397 | 9/1961 | Schmiel | 137—596.13 |
| 3,104,679 | 9/1963 | Gouirand | 137—596.2 XR |

FOREIGN PATENTS 588,459  11/1933  Germany.

HENRY T. KLINKSIEK, Primary Examiner

U.S. Cl. X.R.

137—596.2, 596.13